US012322899B2

(12) United States Patent
Bertsch

(10) Patent No.: US 12,322,899 B2
(45) Date of Patent: Jun. 3, 2025

(54) PLUG CONNECTOR WITH LOCKING SYSTEM

(71) Applicant: Amphenol-Tuchel Industrial GmbH, Heilbronn (DE)

(72) Inventor: Michael Bertsch, Heilbronn (DE)

(73) Assignee: AMPHENOL-TUCHEL INDUSTRIAL GMBH, Heilbronn (DE)

( * ) Notice: Subject to any disclaimer, the term of this patent is extended or adjusted under 35 U.S.C. 154(b) by 733 days.

(21) Appl. No.: 17/614,591

(22) PCT Filed: May 28, 2020

(86) PCT No.: PCT/EP2020/064872

§ 371 (c)(1),
(2) Date: Jun. 14, 2022

(87) PCT Pub. No.: WO2020/239926

PCT Pub. Date: Dec. 3, 2020

(65) Prior Publication Data

US 2022/0320794 A1 Oct. 6, 2022

(30) Foreign Application Priority Data

May 28, 2019 (DE) ..................... 10 2019 114 262.8

(51) Int. Cl.
*H01R 13/625* (2006.01)
*H01R 13/639* (2006.01)
*H01R 13/627* (2006.01)

(52) U.S. Cl.
CPC ......... *H01R 13/625* (2013.01); *H01R 13/639* (2013.01); *H01R 13/6271* (2013.01)

(58) Field of Classification Search
CPC . H01R 13/625; H01R 13/639; H01R 13/6271
USPC .......................................................... 439/314
See application file for complete search history.

(56) References Cited

U.S. PATENT DOCUMENTS

| | | | | | |
|---|---|---|---|---|---|
| 2,561,677 | A | * | 7/1951 | Souriau | H01R 13/62 439/319 |
| 3,393,927 | A | * | 7/1968 | Mccrea | H01R 13/623 285/388 |
| 3,611,260 | A | * | 10/1971 | Colardeau | H01R 13/625 439/317 |

(Continued)

FOREIGN PATENT DOCUMENTS

| | | | |
|---|---|---|---|
| CN | 208753591 | U | 9/2018 |
| NL | 6409881 | A | 8/1964 |

*Primary Examiner* — Alexander Gilman
(74) *Attorney, Agent, or Firm* — CANTOR COLBURN LLP

(57) ABSTRACT

The invention relates to a locking system for connectors for connecting and locking a plug to its plug partner, comprising a primary lock formed by at least one bayonet ring with at least one control gate, coupled to a connector plug and designed for functional cooperation with at least one pin associated with the control gate on a connector mating plug, wherein the control gate has a Z-shaped course so that a two-stage movement kinematics of the primary locking is supported. Furthermore, the invention relates to a plug connection for making a detachable electrically conductive connection, comprising a connector plug and a connector mating plug with a locking system.

17 Claims, 3 Drawing Sheets

(56) References Cited

U.S. PATENT DOCUMENTS

| | | | | | |
|---|---|---|---|---|---|
| 4,440,464 | A * | 4/1984 | Spinner | H01R 27/00 439/314 |
| 4,478,473 | A * | 10/1984 | Frear | H01R 13/622 439/312 |
| 4,645,281 | A * | 2/1987 | Burger | H01R 13/6397 439/306 |
| 5,820,409 | A * | 10/1998 | Clark | B60L 50/52 439/157 |
| 5,913,691 | A * | 6/1999 | Clark | H01R 13/641 439/157 |
| 7,455,542 | B2 * | 11/2008 | Norwood | H01R 13/625 439/318 |
| 7,641,480 | B1 * | 1/2010 | Hossack | H01R 13/625 439/492 |
| 7,726,999 | B2 * | 6/2010 | Vanzo | H01R 13/6397 439/333 |
| 7,988,479 | B2 * | 8/2011 | Hankins | H01R 13/625 439/314 |
| 8,192,218 | B2 * | 6/2012 | Sasaki | H01R 13/623 439/320 |
| 8,920,200 | B2 * | 12/2014 | Blaxland | F03B 13/264 439/848 |
| 10,348,033 | B2 * | 7/2019 | Stucchi | H01R 13/642 |

* cited by examiner

PLUG CONNECTOR WITH LOCKING SYSTEM

This application is a national stage application of International Application No. PCT/EP2020/064872, filed May 28, 2020, which is related to and claims priority to German Patent Application No. 10 2019 114 262.8, filed May 28, 2019, the entire disclosures of which are hereby incorporated by reference.

FIELD

The invention relates to a connector locking system for connecting and locking a plug to its plug partner, including a primary locking formed by at least one bayonet ring having at least one control gate coupled to a connector plug and designed to functionally cooperate with at least one pin associated with the control gate on a connector mating plug.

BACKGROUND

Plug connections, contacting elements, pole connectors, receptacles, etc. are used in a wide variety of designs and variants for contacting or making detachable electrically conductive connections. Especially, but not exclusively for electrical contacting tasks in the higher power range, contact systems have been developed that are based on round contact geometries for receiving a contact pin.

Such high-voltage connectors are often implemented as circular connectors with one or more plug-in contact pins and, in addition to reliable, detachable and permanent contacting, are also secured in particular against unintentional disconnection or disconnection caused by axial tensile loads of the plug connection.

In the prior art, bayonet or screw locks are often used as primary locking for circular connectors. These securing means are usually permanently attached to the respective plug connections and are supplemented by secondary locks to secure against unintentional disconnection. In the prior art, securing means are typically used as spring-like arrangements that engage with corresponding openings or latches, thereby causing two parts of a circular plug connection to lock together.

Furthermore, circular connectors are known in which the plug connection is made via so-called bayonet locks. An alternative form of locking is a twist-locking, similar to a bayonet lock, which is attached to each of the plug connections in such a way that a locking screw is used to secure the pair of connectors to a locking thread.

Locks of this type are particularly problematic if it is to be prevented that the lock is released unintentionally or not as intended and/or the connector under voltage is pulled. In the latter case, arcs can ignite, especially in the high-voltage range, which pose safety problems and can endanger lives.

Also, in dynamic applications and when machines are vibrating, the problem can arise that connector locks, especially screw locks, can become loose over time as a result of these mechanical vibrations and the connector is no longer reliably connected to the mating plug.

A connector solution with primary and secondary locking is presented in DE 10 2013 112 103 A1. A plug of this plug connection includes an inner assembly, an outer sleeve displaceably mounted with respect to the inner assembly and at least partially enclosing the inner assembly, and first locking means for locking the plug to an associated connector part when the plug is plugged onto the connector part, wherein the locking is releasable by displacement of the outer sleeve with respect to the inner assembly.

Such connectors, including a plug and a connector part, are known as push-pull connectors. This name is derived from the function of such connectors. This allows them to be closed by simply pushing the plug onto the connector part in one insertion direction ("push"). The connector part can be a socket or a second plug. When plugging on or by plugging on, locking means of the plug and the connector part are locked together so that the connector is not damaged by a pull e.g. on a cable connected to the connector. To release the connection, the outer sleeve of the plug is pulled against the direction of insertion ("pull"). This causes a relative movement between the outer sleeve and the inner assembly of the plug, which unlocks the locking means. If the outer sleeve is pulled further against the insertion direction, the plug is released from the connector part.

For other types of connectors, an additional operation is performed to lock or unlock. Such an operation would be, for example, the lifting or depressing of a latching hook serving as a locking means or an additional rotational movement of the outer sleeve, as is common, for example, with so-called bayonet connectors.

A disadvantage is that, if necessary, the connector can be accidentally released due to the simple unlocking process by pulling on the outer sleeve. Another disadvantage of the connectors of this push-pull type is that any person who has access to the connector can disconnect such a connector without any other tools. Accidental, arbitrary or unauthorized disconnection cannot be prevented with the familiar connectors of the push-pull type.

DE 10 2013 112 103 A1 proposes that an additional locking element is provided, which is displaceably mounted and can be brought into at least one stable locked position, in which the displacement of the outer sleeve with respect to the inner assembly is blocked, and at least one stable release position, in which the displacement of the outer sleeve with respect to the inner assembly is released, is obtainable.

DE 20 2008 013 794 U1 discloses a plug connection device with two coupling halves including a plug part and a socket part for connecting and disconnecting multi-core electrical power and/or low-current lines, each coupling half including a substantially cylindrical housing accommodating electrical contact elements, both of which can be coupled by means of a union sleeve.

At one of its two open ends, the union sleeve includes a radially inwardly projecting lug for engagement in a locking groove formed at the housing end of one of the two coupling halves. The locking groove includes an end section running in the circumferential direction, into which an axially or obliquely running insertion section opens, wherein a torsion spring is arranged in the union sleeve, which is supported with one end in the union sleeve and with the other end on the housing end not provided with the locking groove.

This three-part plug connection device is coupled or decoupled via a bayonet system. The torsion spring has the effect of a closing spring, which automatically turns the union sleeve into the closed position when the two coupling halves are mated.

DE 20 2005 010 113 U1 shows another connector device. A connector coupling is presented, including a first coupling half, that is at least one coupling housing, a contact carrier accommodated therein together with contact elements and a coupling element which engages around the contact carrier and possibly its contact elements at least over part of their axial length, with an external thread for optionally screwing on a union nut rotatably coupled to a second coupling half or for connecting a connecting element rotatably coupled to a second coupling half and equipped with means for bringing about a quick locking, suitable region of the coupling housing.

The primary locking is optionally designed as a screw connection, for example by means of a union nut or as a bayonet locking. As a secondary lock, a reverse rotation lock or a lock against unintentional rotation due to vibrations is assigned to a plug connection partner. Such a reverse rotation lock is formed in that the reverse rotation lock or lock against unintentional rotation due to vibrations assigned to the threadless connecting element of the second coupling half includes at least one spring element fixed to the coupling housing of the second coupling half and a detent assigned to it on the inner circumference of the sleeve forming the connecting element, wherein a simple realization results from the fact that the spring element or elements fixed to the coupling housing of the second coupling half are formed by radially projecting leaf spring sections with which notch-shaped detents are associated on the inner circumference of the sleeve forming the connecting element.

DE 20 2010 017 274 U1 shows another secondary locking solution in combination with a bayonet as primary locking.

A secondary locking means is attached to one of the connectors in such a way that the primary locking means, preferably the locking ring, is held in position by the secondary locking means in its intended locked state. By releasing the secondary locking means as intended, the locking ring can be unlocked from its locking position and released in the opposite direction to the locking direction. The secondary locking or secondary locking means is formed as a spring pin arranged between the connector and the connector socket. A so-called pogo pin can be used as a spring pin for this purpose.

The pogo pin is designed in such a way that the spring pin can spring into the spring pin body and, when the spring pin is released from the spring pin body, it can return to its original position against a spring force of a spring arranged in the spring pin body.

The spring pin is arranged on the connector socket in such a way that it can dip into a recess on the locking ring of the connector after the locking ring has been locked, in that the spring pin engages in a recess on the locking ring and thus secures the locking ring against loosening. At the end of the locking process, the spring pin engages the corresponding secondary locking recess and fixes the primary locking, preferably a locking ring, in its intended position. The arrangement of the spring pin relative to the connector partners is always selected so that the spring pin movement takes place axially to the connector in a recess that is also axially aligned.

SUMMARY

The disclosure provides a connector which at least partially reduces the aforementioned disadvantages and, in particular, prevents unwanted disconnection of the plug connection or disconnection caused by environmental influences on the plug connection. A safety-relevant disconnection of the connectors under voltage is to be counteracted with high reliability.

The disclosure employs a locking system for connectors, in particular for high-voltage connectors (DC connectors) with a primary locking formed by a bayonet lock and a functionally coupled secondary locking formed by at least one locking slide.

The primary locking is effected by a two-stage bayonet lock, which can be locked in the lock end position by the secondary locking to prevent unintentional release. The secondary locking is provided by at least one locking slide, which is either a functionally integrative part of the bayonet ring or of the associated connector housing.

The at least one gate of the bayonet principle-based lock solution provides two latching positions to an associated pin, which is achieved by the Z-shaped extension. The two latching positions are assigned a first and a second plug depth of the corresponding connector mating plug.

The bayonet ring has a rotational degree of freedom that supports two end position positions. The bayonet ring is designed to have at least two positions, which can be achieved by a combination of axial-linear displacement and rotational movement. One of the end positions supports an unlocked state of the primary locking, the other end position supports the locked position. In the unlocked position (when plug and mating plug can be separated), the respective assigned pin can be moved through the gate. In the locked position of the bayonet ring, the functionally coupled secondary locking can be activated, so that the movement from the locked position in the gate groove is blocked with the result that the connector cannot be released.

The secondary locking, which is designed as a locking slide, can be moved to a position that prevents movement of the pin in the gate by means of a stop and locks it in the locked position. At the same time and integratively, the rotational degree of freedom of the bayonet ring is blocked so that the bayonet ring cannot be moved out of its locked position.

With the locking system for connectors according to the invention, in particular for high-voltage connectors with primary and secondary locking, not only are a number of the previously mentioned disadvantages of the prior art at least partially reduced, but further advantages are achieved:

- In the locked position, shock and/or vibration resistance is increased. Independent rotation of the locking ring due to vibrations can be ruled out, since the ring is held in the locked position by means of the secondary locking formed by at least one locking slide;
- unauthorized release of the plug connection can be prevented by the optional design of the locked position, in that the secondary locking is only released by a tool;
- the Z-curved configuration of the bayonet gate forces two-stage movement kinematics, so that rapid disconnection of the plug connection is prevented.

To prevent arcing, two switching contacts are initially released when the connector is pulled out, causing the system to switch off the voltage. During this time, the high-current contact remains plugged in. In order to reduce capacitance and inductance in the system, a short period of time should be allowed for the charge to dissipate after the two switching contacts have been disconnected. In the case of two-stage motion kinematics due to the Z-curved bayonet gate, after reaching the pin position in the Z-curve (intermediate stage, first latching position), first an axial and then a rotational movement component of the connector elements relative to each other is realized in order to release the plug connection and the contacting of the plug contact pins. The time required by the movement kinematics ensures that the plug contacts are de-energized before the actual release and that arcing does not occur—the geometric design of the secondary locking as a largely identically shaped counterpart of the path of movement defined by the bayonet gate for the associated pin prevents incorrect locking outside the defined locked position, which is defined by the end position of the pin in the bayonet gate in the gate base.

BRIEF DESCRIPTION OF THE DRAWINGS

The invention is explained in more detail below by means of an exemplary embodiment in conjunction with the figures. Showing.

DETAILED DESCRIPTION

Figure 1:
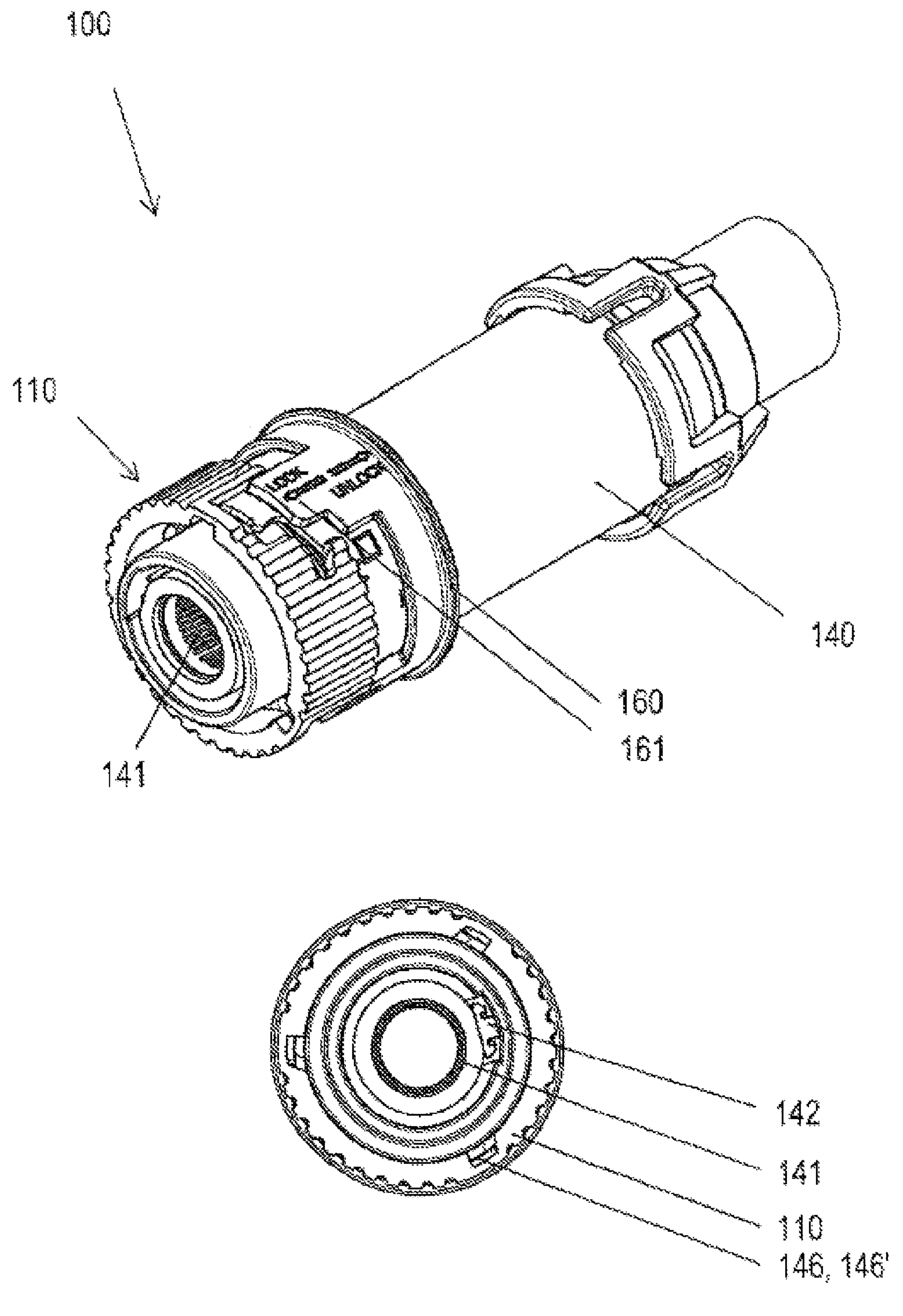
FIG. 1 the perspective and front view of the connector housing with locking system for connectors in an open position ("unlock") of the locking system.

FIG. 1 includes the perspective and front views of the connector housing 140 with locking system for connectors 100 in an open position ("unlock") of locking system 100. Primary components of the locking system 100 of this embodiment are the primary locking formed by the bayonet ring 110, cooperating with at least one pin 151 of the connector mating plug 150, and the secondary locking formed by the locking slide 160.

In this example, the connector housing 140 is made in one piece with the bayonet ring 110, for example made in a plastic injection molding process using a corresponding multi-part mold with sliders. Assembled arrangements are also possible, in which the overall arrangement is constructed and joined in several parts.

Following the bayonet principle, the movement kinematics of the primary locking is rotational in the circumference of a pitch circle movement and combined with an axial-linear movement component as a result of the Z-shaped gate 146, the secondary locking obeys a linear movement in the axial direction of the connector housing 140. The secondary locking, implemented as a locking slide 160, is annular in shape with at least one engagement 161 and is coupled externally to and movable with the connector housing 140.

The connector contacting is axially centered with a preferably round plug contact. In the example shown, contacting is provided by means of a lamellar contact bush 141.

FIG. 1 shows an arrangement of three gates 146 and inlet/outlet grooves 146', symmetrically distributed around the circumference of the connector housing 140 or evenly distributed around the circumference. This design, which is often advantageous for static reasons, can also be designed differently depending on the area of application or environmental conditions, for example asymmetrically or with one, two or more than three functionally interacting gate arrangements. Corresponding and congruent to the number and position of the gates 146 and the inlet/outlet grooves 146' are provided for both the engagements 161 of the locking slide 160 and the recesses 113 of the bayonet ring 110. The gates 146 include a locked position 147 and an unlocked position 148.

Figure 2:
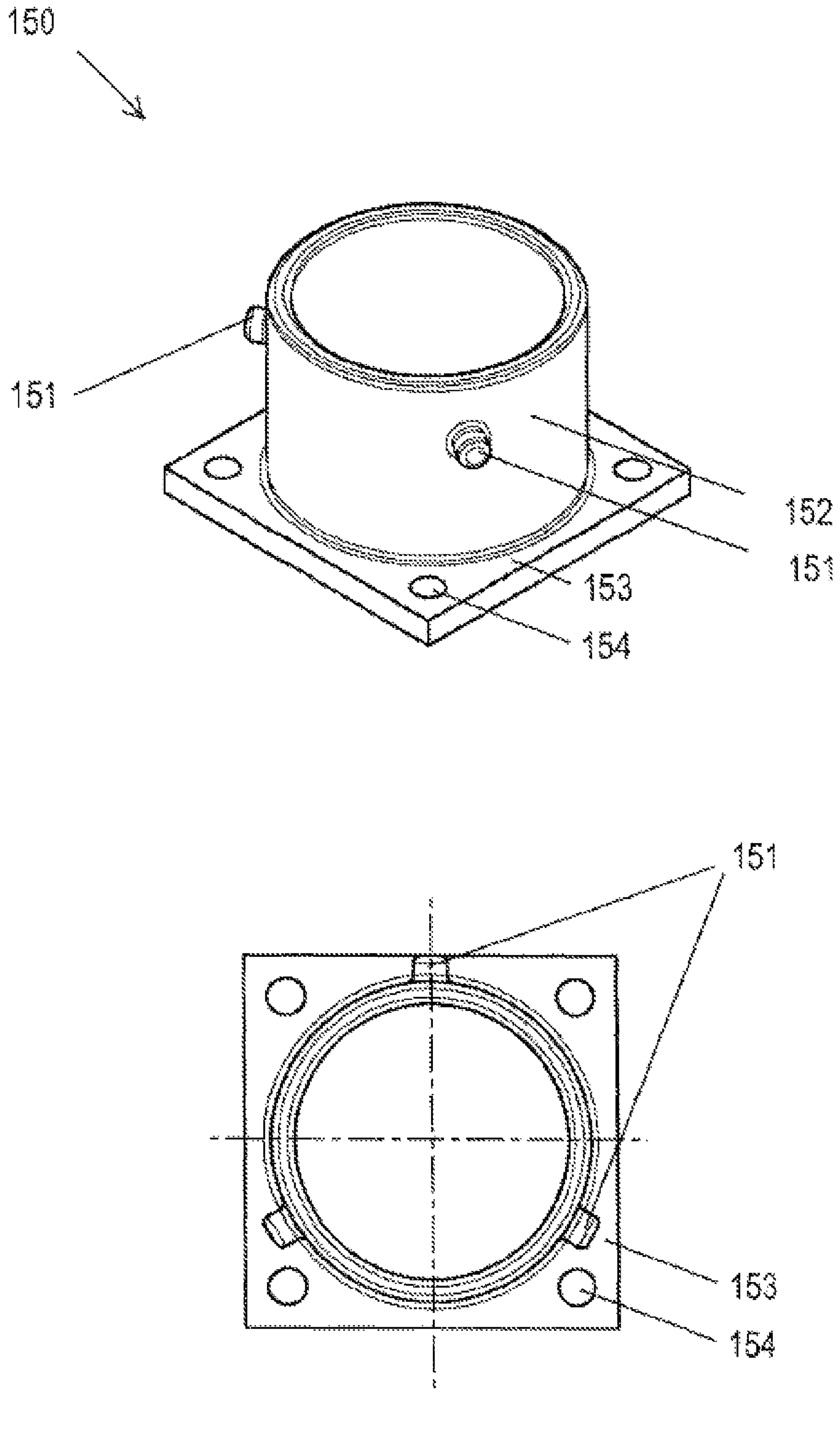
FIG. 2 the three-dimensional as well as the top view of the socket mating plug with pin and sleeve section.

FIG. 2 shows the three-dimensional as well as the top view of the socket mating plug 150 with pin 151 and sleeve section 152. Concentric with an ring gap disposed in the front side of the connector housing 140, the sleeve section 152 is inserted therein and the at least one pin 151 extending radially outwardly is threaded into the inlet/outlet groove 146' to initially accomplish primary locking and, after reaching the end position, is secured by secondary locking. That is, the at least one pin 151 may be moved within the gates 146 from the unlocked position 148 to the locked position for primary locking. Preferably, the contacting elements for establishing the electrically conductive connection are arranged inside the socket mating plug 150 (not shown). For the realization of the plug connection, it is irrelevant whether the kinematics of the primary locking is performed by the connector housing 140 or the socket mating plug 150 or a combination of movements—sequential or superimposed—of both plug partners. In the illustrated possible embodiment of the mating plug as a socket mating plug 150, this is preferably fixed via drillings 154 so that the movement kinematics are fully accomplished by the connector housing 140.

Figure 3:
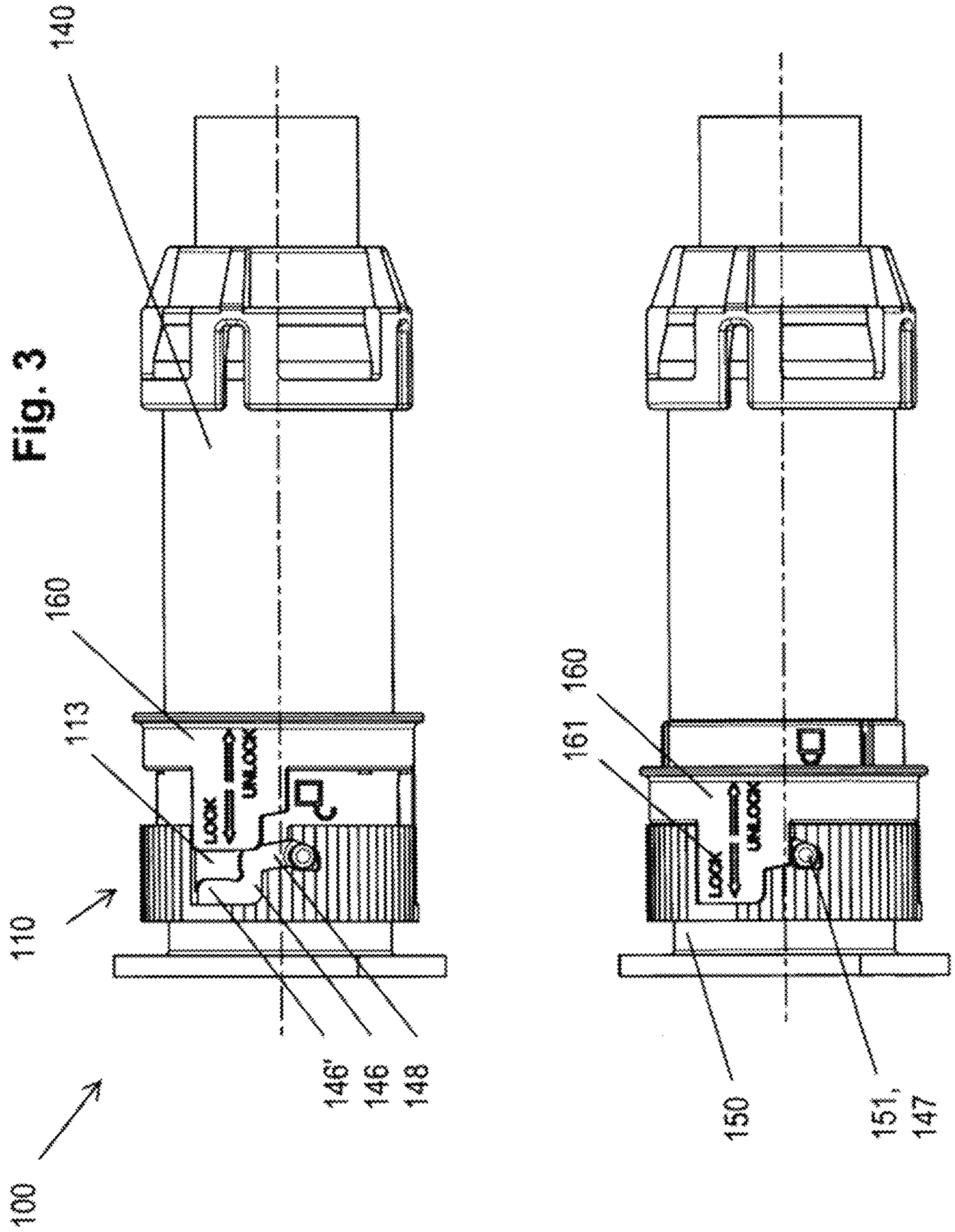
FIG. 3 the side views of the connector housing with locking system for connectors and the secondary locking in unlocked (upper figure, "unlock") and locked (lower figure, "lock") position.

FIG. 3 includes side views of the connector housing with locking system for connectors 100 and the secondary locking 160 in unlocked (upper figure, "unlock") and locked (lower figure, "lock") positions, wherein both illustrations represent the primary locking in its connected end position in that the at least one associated pin 151 is in the end latching position, locked position 147 in the gate 146.

The secondary locking is activated by moving the locking slide 160 axially from the open position "unlock" to the closed position "lock" and retracting the engagement 161 into the recess 113 of the bayonet ring 110. The engagement 161 is the contour-congruent counterpart to the recess 113 as well as the Z-curved configuration of the bayonet gate 146 and locks the associated pin 151 in its locked position 147 with an engagement shoulder, so that the rotational kinematics of the primary locking is locked.

The invention claimed is:

1. A locking system for connectors comprising:
- a primary lock comprising:
  - a connector mating plug comprising at least one pin; and
  - at least one bayonet ring of a connector housing, comprising at least one control gate; and
- a secondary lock coupled to the primary lock,
- wherein the at least one pin is engaged with the at least one control gate, and
- wherein the at least one control gate has a Z-shaped course to support a two-stage movement of the at least one pin within the at least one control gate,
- wherein the secondary lock is configured to secure the primary lock in the locked position of the at least one control gate with respect to the at least one pin,
- wherein the secondary lock is formed by a locking slide,
- wherein the locking slide comprises at least one engagement structure configured to engage with the at least one pin.

2. The locking system for connectors according to claim 1, wherein the bayonet ring has at least one recess adjacent to the at least one control gate.

3. The locking system for connectors according to claim 1, wherein an intermediate latching position is arranged in between first and second terminal ends of the Z-shaped course of the control gate, such that the connector housing may be separated from the connector mating plug only by both axial and radial displacement of the bayonet ring relative to the connector mating plug.

4. The locking system for connectors according to claim 1, wherein the locking slide is movable between an open position and a closed position.

5. The locking system for connectors according to claim 1, wherein the locking slide is configured to move linearly along an axial direction with respect to the connector housing, which represents a movement in and against an insertion direction.

6. The locking system for connectors according to claim 1, wherein the bayonet ring has at least one recess a adjacent to the at least one control gate, wherein the at least one engagement structure has a contour congruent to the at least one recess.

7. The locking system for connectors according to claim 1, wherein the at least one bayonet ring comprises a portion having parallel elongate protrusions extending in an axial direction, and wherein at least a portion of the at least one gate is formed within the portion having the parallel elongate protrusions.

8. The locking system for connectors according to claim 1, wherein an axial end of the at least one engagement structure is shaped to correspond to the at least one gate.

9. The locking system for connectors according to claim 1, wherein the bayonet ring is movable between an unlocked position of the at least one control gate with respect to the at least one pin and a locked position of the at least one control gate with respect to the at least one pin, wherein the primary lock is locked when the at least one control gate is in the locked position with respect to the at least one pin.

10. The locking system for connectors according to claim 9, wherein the at least one control gate has a first terminal end and a second terminal end, and wherein the locked position of the at least one control gate with respect to the at least one pin corresponds to the at least one pin being within the second terminal end of the at least one control gate.

11. The locking system for connectors according to claim 10, wherein the at least one control gate has a first portion that extends along a tangential direction, a second portion that extends along an axial direction, and a third portion that extends in an oblique direction between the tangential direction and the axial direction, wherein the first terminal end is in the first portion, and wherein the second terminal end is in the third portion.

12. The locking system for connectors according to claim 1, wherein the at least one engagement structure is configured to cover a majority of the at least one control gate when the locking side is in the closed position.

13. A plug connection for making a releasable electrically conductive connection, comprising the locking system according to claim 1.

14. The plug connection for making a releasable electrically conductive connection according to claim 13, wherein the plug connection is a high voltage circular connector.

15. A locking system for connectors comprising:

a primary lock comprising:

a connector mating plug comprising at least one pin; and at least one bayonet ring of a connector housing, comprising at least one control gate; and a secondary lock coupled to the primary lock, wherein the at least one pin is engaged with the at least one control gate, and wherein the at least one control gate has a Z-shaped course to support a two-stage movement of the at least one pin within the at least one control gate, wherein the secondary lock is configured to secure the primary lock in the locked position of the at least one control gate with respect to the at least one pin, wherein the secondary lock is formed by a locking slide, wherein the bayonet ring is movable between an unlocked position and a locked position of the at least one control gate with respect to the at least one pin, wherein the primary lock is locked when the at least one control gate is in the locked position with respect to the at least one pin, and wherein the locking slide is movable with the at least one engagement structure into the closed position when the at least one control gate is in the locked position with respect to the at least one pin.

16. The locking system for connectors according to claim 15, wherein the locking slide is not movable with the at least one engagement structure into the closed position when the at least one control gate is in the unlocked position with respect to the at least one pin.

17. A locking system for connectors, comprising:

a receptacle with a bayonet lock, wherein at least one rotatably arranged bayonet ring with a receptacle contour is provided for receiving a back and forth movable locking slide on a mating plug, which then prevents the bayonet ring from rotating when the bayonet ring is in a locked position and inserted in the receptacle, wherein a gate for guiding the pin of the mating plug is arranged at least partially in the area of the receptacle contour and the movement of the locking slide into a securing position is possible only if the pin is located within a region in the gate outside the receptacle contour, and wherein, when the locking slide is in the securing position, the locking slide abuts the pin to prevent movement of the pin when the bayonet ring is in the locked position.

* * * * *